United States Patent [19]

Oushiden et al.

[11] Patent Number: 4,821,067
[45] Date of Patent: Apr. 11, 1989

[54] MICROFILM READER-PRINTER HAVING AN IMAGE FERMATION DEVICE

[75] Inventors: Hideshi Oushiden, Kanagawa; Norio Imada, Setagaya; Takeshi Sambayashi, Tokyo, all of Japan

[73] Assignee: Kabushiki Kaisha Toshiba, Kawasaki, Japan

[21] Appl. No.: 925,064

[22] Filed: Oct. 30, 1986

[30] Foreign Application Priority Data

| Oct. 31, 1985 | [JP] | Japan | 60-245068 |
| Oct. 31, 1985 | [JP] | Japan | 60-245067 |
| May 12, 1986 | [JP] | Japan | 61-108318 |
| May 13, 1986 | [JP] | Japan | 61-109193 |

[51] Int. Cl.$^4$ ............................................. G03G 15/00
[52] U.S. Cl. .............................. 355/14 E; 355/3 CH; 355/14 CH
[58] Field of Search ............... 355/14 E, 3 CH, 3 ER, 355/14 CH

[56] References Cited

U.S. PATENT DOCUMENTS

| 3,373,653 | 3/1968 | Roberts et al. | 355/14 R |
| 3,677,637 | 7/1972 | Van Auken et al. | 355/14 R |
| 4,080,071 | 3/1978 | Kobayashi | 355/14 E |
| 4,324,485 | 4/1982 | Asakura et al. | 355/14 E |
| 4,341,463 | 7/1982 | Kashiwagi et al. | 355/14 CH |
| 4,382,674 | 5/1983 | Miyoshi et al. | 355/14 CH |
| 4,405,224 | 9/1983 | Kasuga et al. | 355/3 R |
| 4,501,483 | 2/1985 | Romansky et al. | 355/3 FU |
| 4,505,575 | 3/1985 | Palumbo | 355/14 E |
| 4,568,173 | 2/1986 | Abuyama | 355/14 E |
| 4,600,293 | 7/1986 | Watanabe | 355/14 E |
| 4,603,964 | 8/1986 | Swistak | 355/3 CH |
| 4,618,245 | 10/1986 | Fukushi et al. | 355/14 SH |
| 4,627,703 | 12/1986 | Sukuki et al. | 355/8 |
| 4,627,710 | 12/1986 | Goetz | 355/14 R |
| 4,633,405 | 12/1986 | Ito et al. | 355/14 R |
| 4,634,260 | 1/1987 | Watanabe | 355/14 E |
| 4,673,282 | 6/1987 | Sogama | 355/14 E |
| 4,712,905 | 12/1987 | Arito et al. | 355/3 CH |

FOREIGN PATENT DOCUMENTS 2315763 10/1973 Fed. Rep. of Germany ... 355/3 ER
56-117259 9/1982 Japan .

OTHER PUBLICATIONS

Leupold et al., "Charge Corona Edge Shield"; IBM Technical Disclosure, vol. 15, No. 7, p. 2060, Dec. 1972.

Primary Examiner—Patrick R. Salce
Assistant Examiner—J. Sterrett
Attorney, Agent, or Firm—Cushman, Darby & Cushman

[57] ABSTRACT

A microfilm reader-printer including an image formation device having an image bearing roll, a charger, an exposure apparatus, an apparatus which carries out the normal development of the image bearing roll, an apparatus which carries out the inverted development of the image bearing roll, and an apparatus which transfers the toner image which is formed on the image bearer. The reader-printer further includes a switch which specifies the size of the recording paper, an exposure shutter device, and a microcomputer. The microcomputer directs forming a toner image only in a region on the image bearer that can be transferred to the recording paper, in accordance with the size of the recording paper that is detected by a detector, in such a way as to control, in the case of the inverted development, the opening and closing of the exposure shutter device, and to control, in the case of the normal development, the charger. In addition, this microfilm reader-printer includes a freely attachable and detachable developing apparatus which develops the image bearing roll, an apparatus which transfers a toner image formed on the image bearer to the recording paper, and a microcomputer which controls the image formation unit so as to bring only the image formation operation to a standstill when the developing apparatus is not set on the image formation unit.

9 Claims, 15 Drawing Sheets

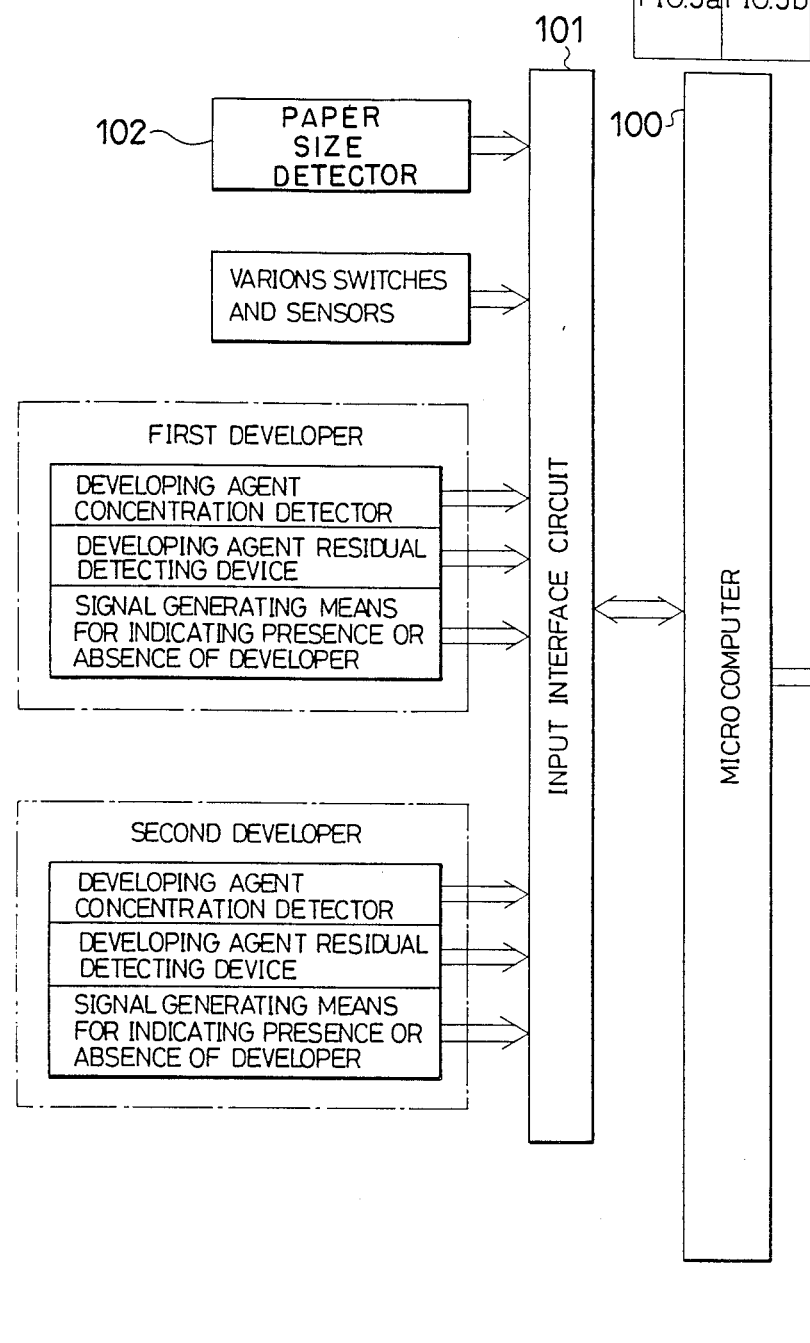

MICROFILM READER-PRINTER HAVING AN IMAGE FERMATION DEVICE

BACKGROUND OF THE INVENTION

1. Field of the Invention

The present invention relates to an image formation device which can carry out the normal development and the inverted development by switching between them, and to a microfilm reader-printer which includes such an image formation device.

2. Description of the Prior Art

In a prior-art microfilm reader-printer of the above kind, if the paper to be used for copying is set to be of the A4 size, then there is formed an image of A4 size on the photosensitive drum. In transferring an image formed on the photosensitive drum to a copying paper, the leading edge of the image on the photosensitive drum and the leading edge of the paper are set to be flush with each other.

Now, if a letter paper is used as the copying paper in the above, its length is not large enough to cover the end portion of the image on the drum. As a result, development and transfer will continue to be carried out even after the end of the paper passed the transfer position, and the toner on the photosensitive drum makes contact with the transfer charger, which may pollute the toner.

In so doing, the toner will be wasted. In addition, due to the toner pollution by the transfer charger, especially in a reader-printer designed for image pickup from microfilms, there was a problem that the transfer cannot be carried out properly since the microfilm has a black background in the margins. Further, in an image formation device which carries out the inverted development, an exposed portion of the photosensitive drum is developed and there exists, in general, a rise or a fall time of the exposure lamp when it is turned on or off, that is, it takes 1 or 2 seconds before the exposure lamp rises or falls completely.

For this reason, the portions that come before the leading edge and after the trailing edge of the effective image formation region are also exposed and developed. This results in a problem which brings about wastes of the toner and an increase in the burden to the cleaner of the residual toner.

Moreover, in an image formation device which can be switched between the normal development and the inverted development, in the case of carrying out an inverted development, the photosensitive drum will be developed if it is not given a sufficiently high potential. Therefore, development of the nonimaging section in the axial direction of the photosensitive drum is prevented by setting the charging width to be greater than the exposure width and the exposure width to be slightly wider than the paper width.

Further, as for the developing width, it used to be set somewhat wider than the paper width, since the development at the end portions of the paper will become unsatisfactory if the developing width approaches the paper width. Accordingly, the relationship between the various widths is given by "charging width > developing width > exposure width > paper width." However, when normal development is carried out using such an image formation device, the nonimaging portion is also developed so that it leads to a waste of the toner and to an increase in the burden to the cleaner which cleans the residual toner.

On the contrary, in an image formation device which is set for the normal development as "exposure width > developing width > charging width > paper width," areas outside of the charging region of the photosensitive drum will be developed in the inverted development, so that there is also a problem of bringing about a waste of the toner. In other words, in the existing image formation device, there was a problem that the toner is wasted when switching between the inverted development and the normal development is carried out.

Further, in an image formation device such as a microfilm reader-printer, even when the image formation operation is started under a condition in which the developing apparatus is not set, the image will never be copied on the paper. Because of this, if the system is designed such that all of the functions are to be interrupted when both of the developing apparatuses are removed, the system cannot be used as a microfilm reader, in spite of the fact that it should still be usable in principle for that purpose.

SUMMARY OF THE INVENTION

An object of the present invention is to provide an image formation device which can prevent a wasteful consumption of the toner and a pollution of the transfer charger.

Another object of the present invention is to provide an image formation device which can expose and charge solely the region which is to be transferred to the recording medium.

Another object of the present invention is to provide a microfilm reader-printer which can be used as a microfilm reader even under a condition which forbids the operation of image formation.

Another object of the present invention is to provide a microfilm reader-printer which can prevent a wasteful use of the toner when it is switched between the normal development and the inverted development.

A feature of the present invention is that in an image formation device which includes an image bearing roll on which is formed a toner image, a charger which charges the image bearing roll, an exposure apparatus which forms an electrostatic latent image by exposing the charged image bearing roll, an apparatus for normal development which carries out the normal development of the image bearing roll on which is formed an electrostatic latent image, an apparatus for inverted development which carries out the inverted development of the image bearing roll, and a transferring apparatus which transfers the toner image which is formed on the image bearer. The present invention is further equipped with a designation switch which specifies the size of the recording paper, an exposure shutter device, and a microcomputer. The microcomputer carries out a control so as to form a toner image only in a region on the image bearer that can be transferred to the recording paper, in accordance with the size of the recording paper that is detected by a detector, in such a way as to control, in the case of the inverted development, the opening and closing of the exposure shutter device in order to regulate the exposed length in the direction perpendicular to the axial direction of the image bearing roll, and to control, in the case of the normal development, the charger in order to regulate the charged length in the direction perpendicular to the axial direction of the image bearing roll.

Another feature of the present invention is that in an image formation device which includes an image bearing roll on which is formed a toner image, a charger which charges the image bearing roll, an exposure apparatus which forms an electrostatic latent image by exposing the charged image bearing roll, an apparatus for normal development which carries out the normal development of the image bearing roll on which is formed an electrostatic latent image, an apparatus for inverted development which carries out the inverted development of the image bearing roll, and a transferring apparatus which transfers the toner image which is formed on the image bearer. The present invention is further equipped with a designation switch which specifies the size of the recording paper, a discharge light source device which is provided adjacent to the exposure light path of the exposure apparatus, and a microcomputer which controls the discharge light source device so as to have the exposed width and the charged width in the axial direction of the image bearing roll in such a way as to set the exposed width to be greater than the charged width for normal development, and the charged width to be greater than the exposed width for inverted development.

Another feature of the present invention is that in a microfilm reader-printer which projects the image of a microfilm and records the projected image on the recording paper, the present invention is equipped with (a) a film setting unit which has film pressing plates for placing the microfilm and a light source for projection, (b) a projection unit which projects with the light from the light source the microfilm image on the projection screen, (c) a scanning light guiding unit which guides the scanning light obtained by the projection unit, (d) an image formation unit which forms an image on the recording paper based on the scanning light from the scanning light guiding unit, a microfilm reader-printer comprising, an image bearing roll on which is formed a toner image, a charger which charges the image bearing roll, the scanning light exposing the charged image bearing roll in order to form an electrostatic latent image, a freely attachable and detachable developing apparatus which develops the image bearing roll on which is formed an electrostatic latent image, and a transferring apparatus which transfers a toner image formed on the image bearer to the recording paper, and (e) a microcomputer which controls the image formation unit so as to bring only the image formation operation to a standstill when the developing apparatus is not set on the image formation unit.

These and other objects, features and advantages of the present invention will be more apparent from the following description of the preferred embodiments, taken in conjunction with the accompanying drawings.

BRIEF DESCRIPTION OF THE DRAWINGS

FIG. 5a, and 5b are a block diagram for the control circuit in a first embodiment;

DESCRIPTION OF THE PREFERRED EMBODIMENTS

Figure 1:
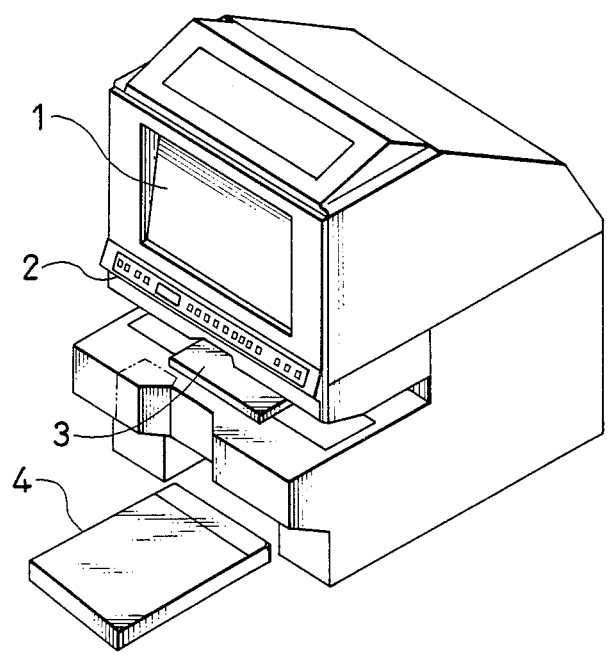
FIG. 1 is an external perspective view of a microfilm reader-printer which employs the present invention.

In FIG. 1 is shown an external view of the microfilm reader-printer which embodies the present invention.

The reader-printer has on its front face side, a projection screen 1 on which is projected an enlarged microfilm, an operating panel 2 which has various kinds of operating keys and others, film pressing plates 3 for holding the microfilm in between, and so forth. In addition, a cassette 4 which feeds papers for film copying is attachable and detachable from the front face side, and a paper on which is transferred the content of a film image is arranged to be ejected from above the opening for attaching and detaching the paper feeding cassette 4.

Figure 2:
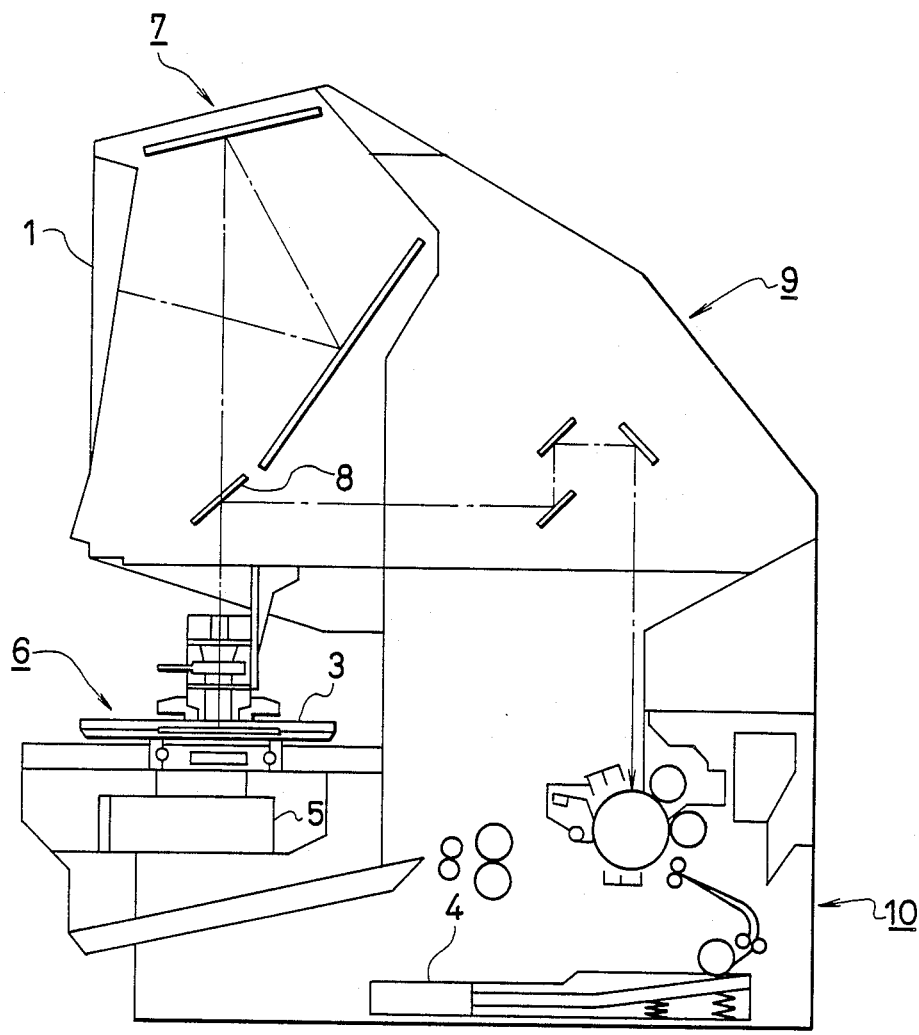
FIG. 2 is an internal block diagram of the microfilm reader-printer.

As shown in FIG. 2, in the interior of the reader-printer, there are provided a film setting unit 6 which has film pressing plates 3 and a light source 5 for projection, a projection unit 7 which projects a film image on the projection screen 1, a scanning light guiding unit 9 which guides the scanning light obtained by a rotatable mirror 8 in the projection unit 7, and an image formation unit 10 which forms an image on a paper in the paper feeding cassette 4, based on the scanning light from the scanning light guiding unit 9.

Figure 3:
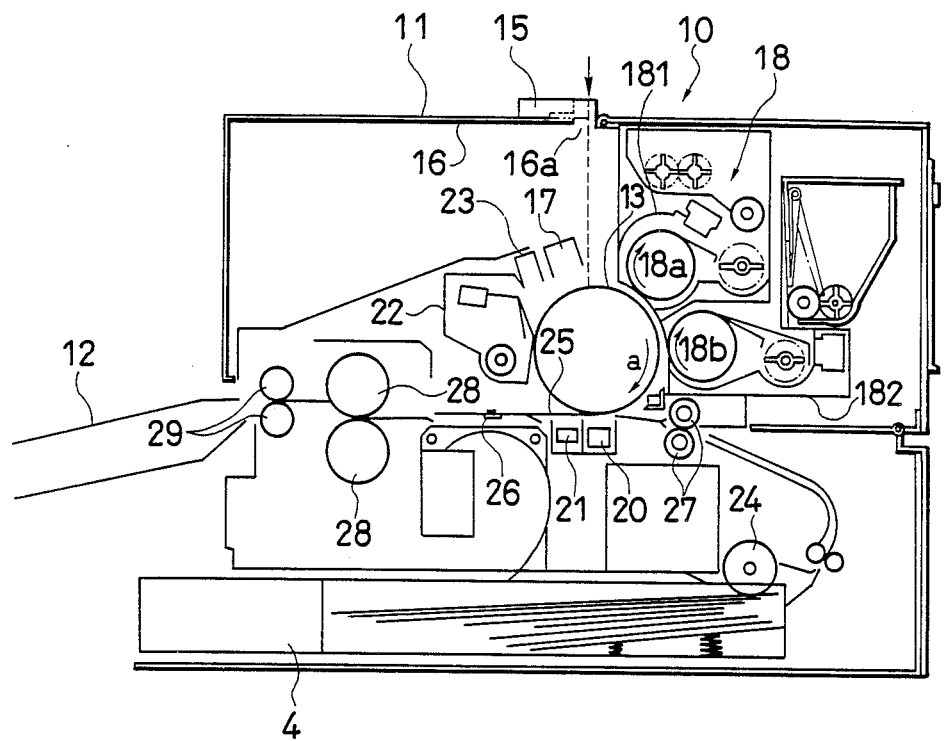
FIG. 3 is an internal block diagram of the image formation unit of the microfilm reader-printer.

In FIG. 3 are shown the details of the image formation unit 10. In the image formation unit 10, 11 is the body of the unit. To the lower front face side of the body 11 is fitted the paper feeding cassette 4, and a tray 12 for ejected paper is fitted above the cassette 4. At about the center of the unit body 11, there is arranged a photosensitive drum 13 which is the bearer of the image, and above the photosensitive drum 13 there is arranged a shutter device 15 which shields scanning light from the scanning light guiding unit 9. Namely, the shutter device 15 is provided above a scanning light incident slit 16a of the upper frame 16, to shield and control the incidence of the scanning light.

Figure 4:
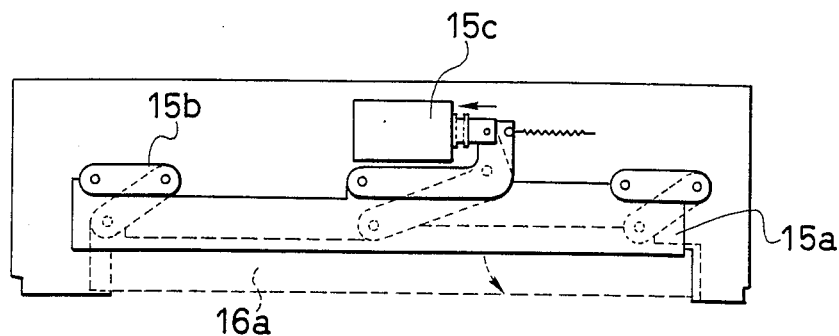
FIG. 4 is a front view of the shutter device shown in FIG. 3.

The shutter device 15 consists, as shown in FIG. 4, of a shutter 15a which shields the scanning light incidence slit 16a, a link mechanism 15b which closes and opens the shutter 15a, and a shutter solenoid 15c which drives the link mechanism 15b. It has a construction which opens the shutter 15a when the shutter solenoid 15c is turned off, and opens the shutter 15a when the shutter solenoid 15c is turned on.

In the surroundings of the photosensitive drum 13, there are arranged a charger 17, a developing device 18, a pre-transfer discharger 19, a transfer charger 20, a detachment (or peeling) charger 21, a cleaner 22, a discharge lamp 23 and others. In the lower part of the unit body 11, there is formed a paper transporting route 26 which leads a paper which is taken out automatically from the paper feeding cassette 4 via paper feeding roller 24 through an image formation unit 25 formed between the photosensitive drum 13 and the transfer charger 20, to the tray 12 for ejected paper. On the upstream side of the image formation unit 25 of the paper transporting route 26, there are arranged resist paper rollers 27, and on the downstream side, there are arranged heat rollers 28 and paper eject rollers 29 as a fixing device.

Now, when the photosensitive drum 13 is driven in the direction of the arrow a, first it is charged uniformly by the charger 17, and then scanning light from the scanning light guiding unit 9 is focused successively on the photosensitive drum 13 to form an electrostatic latent image. The electrostatic latent image thus formed is brought out explicitly by being developed by the developing device 18, and is sent in toward the transfer charger 20. The image formed beforehand on the photosensitive drum 13 is transferred by the transfer charger 20 to a paper which is supplied by the paper feeding cassette 4 and is fed by the resist rollers 27. Then, the paper with transferred image is detached from the photosensitive drum 13 by the detachment charger 21, and is led to the heat rollers 28 by way of the paper transporting route 26. After the transferred image is fixed by melting at the heat rollers 28, the paper is ejected to the tray 12 for ejected paper by the paper eject rollers 29. On the other hand, after transferring the image to the paper, the residual image on the photosensitive drum 13 is erased in preparation for the next copying operation.

The developing device 18 has a first developing roller 18a and a second developing roller 18b, and a selective driving of the developing rollers 18a and 18b is arranged to enable one to develop both of a negatively recorded microfilm and a positively recorded microfilm into positive images. Namely, the developing device 18 is subdivided into a first developing apparatus 181 that contains the first developing roller 18a and a second developing apparatus 182 that contains the second developing roller 18b. The first developing apparatus 181 carries out the positive → positive development, while the second developing apparatus 182 carries out the negative → positive development.

In the development mode which carries out the positive → positive development (referred to as the P-P development mode hereinafter), an image formed on the paper becomes brighter when the exposure to the light source lamp of the light source 5 is increased, and becomes darker when the exposure is decreased. Further, in the development mode which carries out the negative → positive development (referred to as the N-P development hereinafter), the image formed on the paper becomes brighter when the exposure to the light source lamp of the light source 5 is decreased, and becomes darker when the exposure is increased.

Figure 5B:
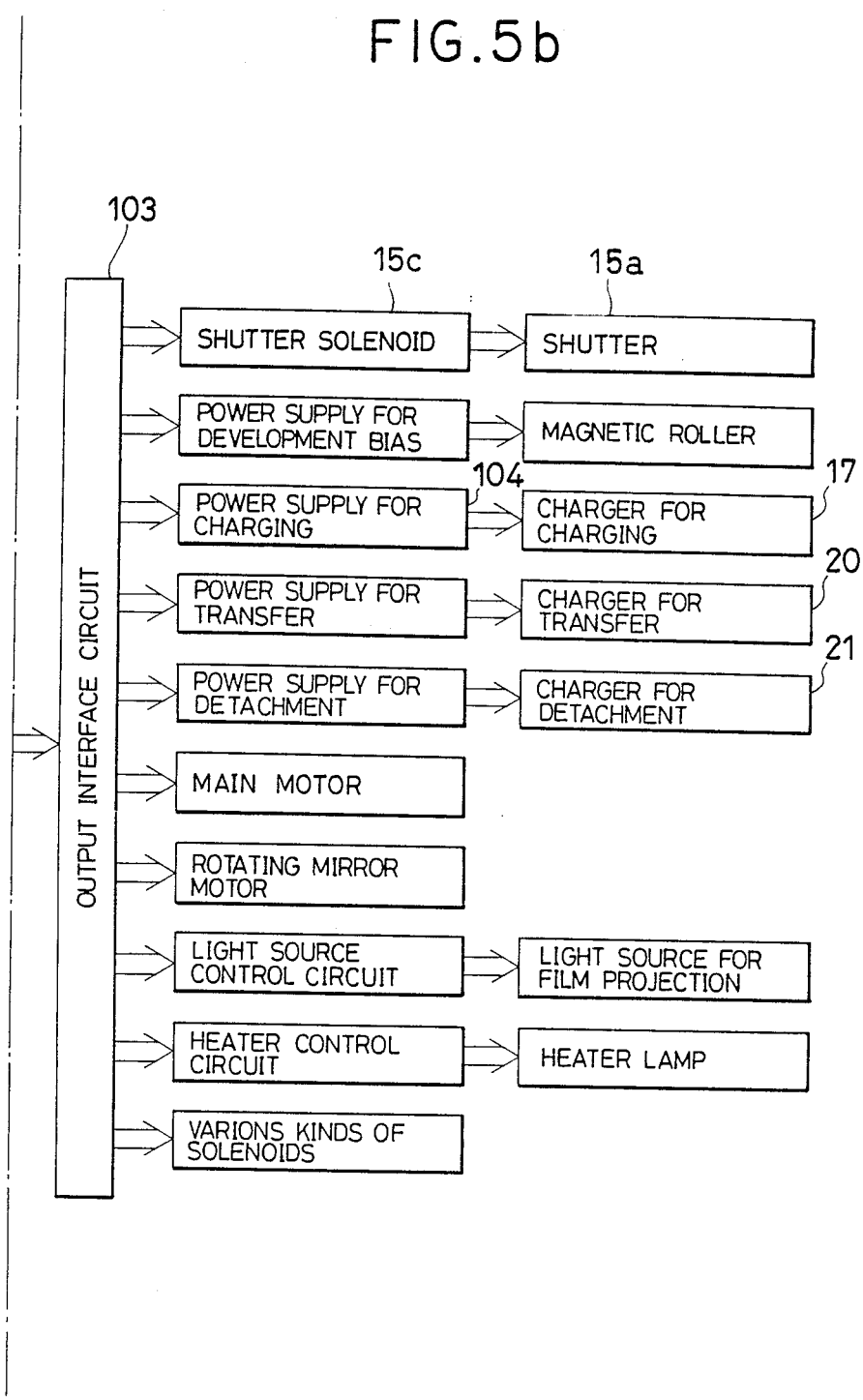

In FIGS. 5(a) and (b) are shown block diagrams for a control circuit of a first embodiment with the above construction. The control circuit includes a microcomputer 100 which carries out the control of the device as a whole. The microcomputer 100 is connected to a paper size detector (DIP switch) 102 and others placed on the operating panel for carrying out the A4/LETTER switching, via an input interface circuit 101 such as a data selector, and the microcomputer 100 reads the state of the DIP switch at the time of initialization after turning-on of the power supply to the main body. Further, the microcomputer 100 is connected via an output interface circuit 103 to a charging power supply 104 of the charger 17, the shutter solenoid 15c of the shutter device, and so on.

The longitudinal length of the image, namely, the length in the direction perpendicular to the axial direction of the drum, that is formed on the drum is determined, in the case of the present machine, by the timing for turning-off of the charger or by the timing for the closing of the shutter. Accordingly, when LETTER is selected by the DIP switch, the microcomputer 100 regulates the exposure length in the direction perpendicular to the axial direction of the drum, in the case of inverted development, and regulates the charging length in the direction perpendicular to the axial direction of the drum, in the case of normal development, in order to match the length of the image formed on the drum to the size of the letter paper. In other words, the microcomputer 100 sends via the interface circuit 103 a control signal to the shutter solenoid 15c when an inverted development is to be carried out, and sends a control signal to the power supply for charging 104 when a normal development is to be carried out, in order to control the above-mentioned timings.

Figure 6:
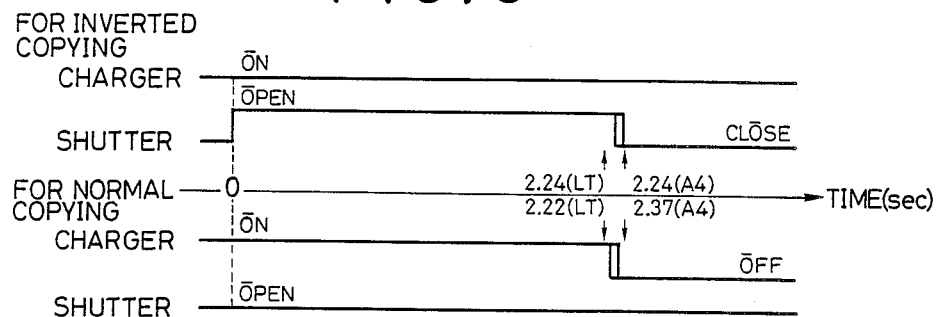
FIG. 6 is a timing chart for controlling the switching of the development modes which form the core of the present invention.

A chart for these timings is shown in FIG. 6. In the figure, the origin of the time axis is chosen at the time of opening the exposure shutter (starting time of exposure).

As indicated in the figure, the timing for closing the shutter and the timing for turning-off the charger are sooner for the letter paper than for the A4 size paper. This difference in the timings corresponds to the difference in the times of passing the transfer point by the last portion of the A4 size paper and the letter paper. In the case of the inverted development, opening and closing of the exposure shutter is controlled, while the charging time is controlled in the case of the normal development.

Figure 7:
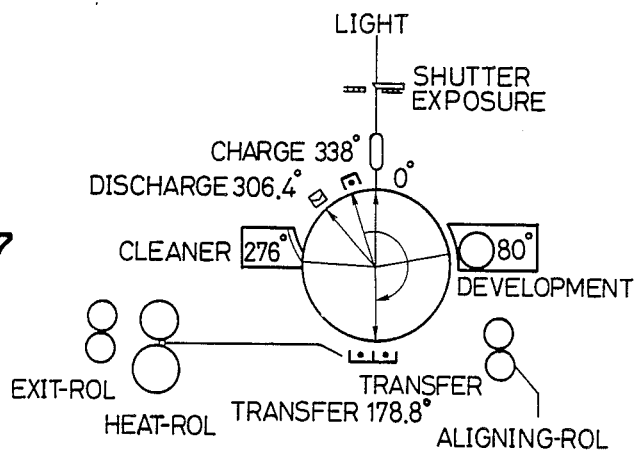
FIG. 7 is a diagram which schematically shows the operation of image formation.

Further, in order to facilitate the understanding of the time chart shown in FIG. 6, the angles at which the timings for charging, exposure, development, transfer, cleaning, and discharging take place are shown in FIG. 7.

Next, several other embodiments of the method of setting the switch for the A4/LETTER changeover will be described. (a) A protrusion for discriminating between an A4 size paper and a letter paper is provided on the paper feeding cassette, and the switch detects the protrusion in the state in which the cassette case is set on the machine. (b) There is provided in the machine a switch which can detect whether or not there is fed a paper. By counting the time during which the switch is pressed (the passing time of the paper) by means of a microcomputer, it can discriminate whether the fed paper is an A4 size paper or a letter paper.

As described in the foregoing, according to the first embodiment of the microfilm reader-printer, a wasteful consumption of the toner and the pollution of the transfer charger can be prevented effectively in forming an image on a special size paper such as a letter paper.

Figure 8:
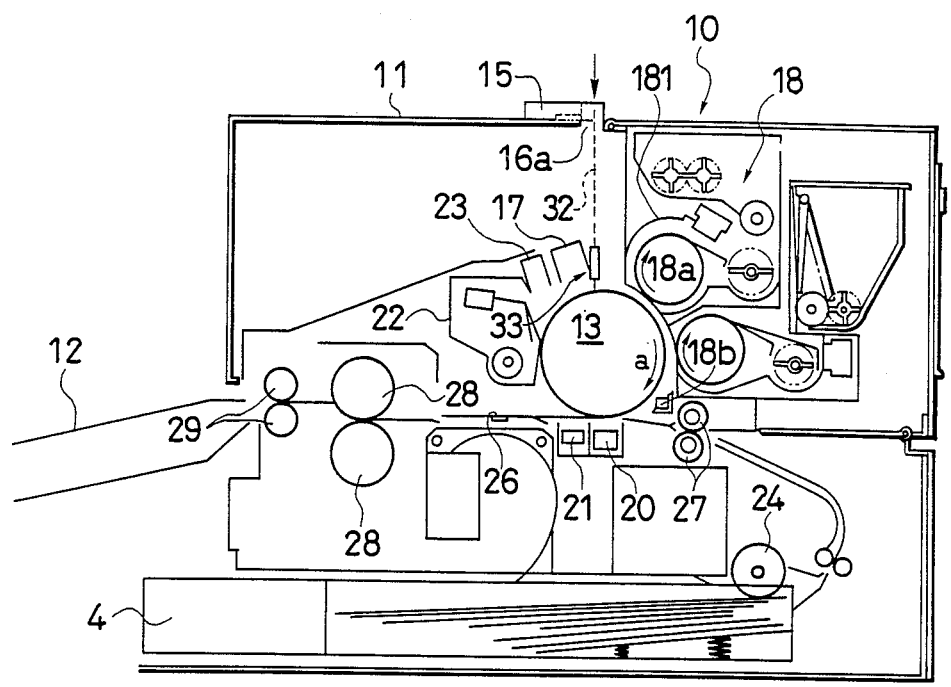
FIG. 8 is an internal block diagram of the image formation unit for a second embodiment of the microfilm reader-printer in accordance with the present invention.

Referring to FIG. 8, a second embodiment of the microfilm reader-printer in accordance with the present invention is shown.

Figure 9:
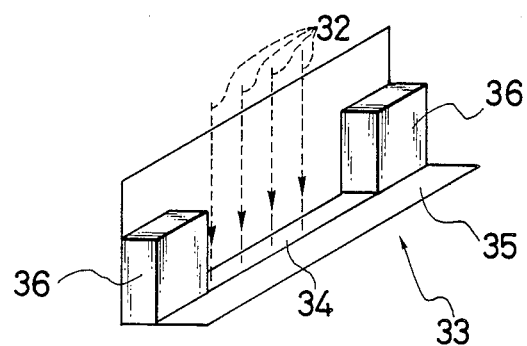
FIG. 9 is a perspective block diagram for the discharge light source shown in FIG. 8.

In the second embodiment, a light source device for discharge 33 is provided, in addition to the devices of the first embodiment, on the scanning light route 32 that forms an electrostatic latent image on the photosensitive drum 13. The discharge light source device 33 consists, as shown in FIG. 9, of an L-shaped frame 35 that has a slit 34 in the scanning light route 32, and a pair of discharge light sources 36. In the normal development, discharge of the photosensitive drum 13 is carried out by the lighting of the light sources 36 to regulate the charged width in the axial direction of the drum.

Figure 10:
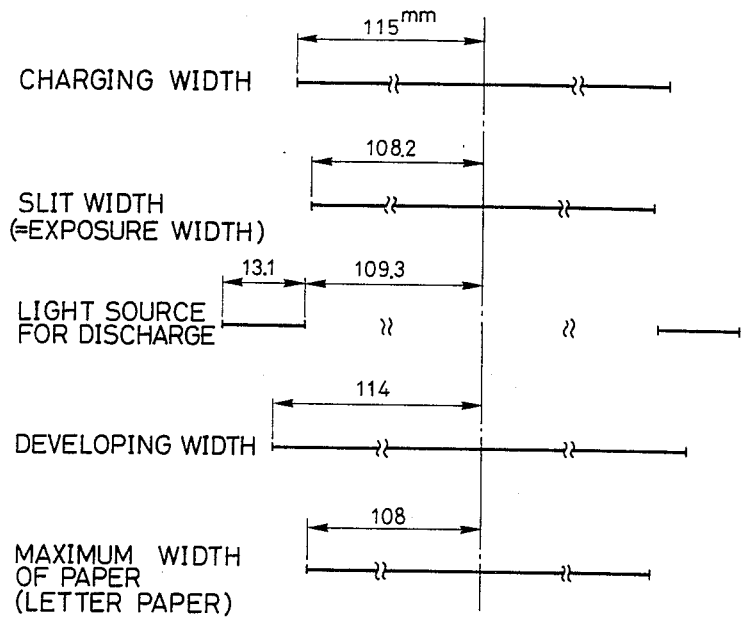
FIG. 10 is an explanatory diagram for showing the action of the discharge light source shown in FIG. 9.
Figures 11, 11A:
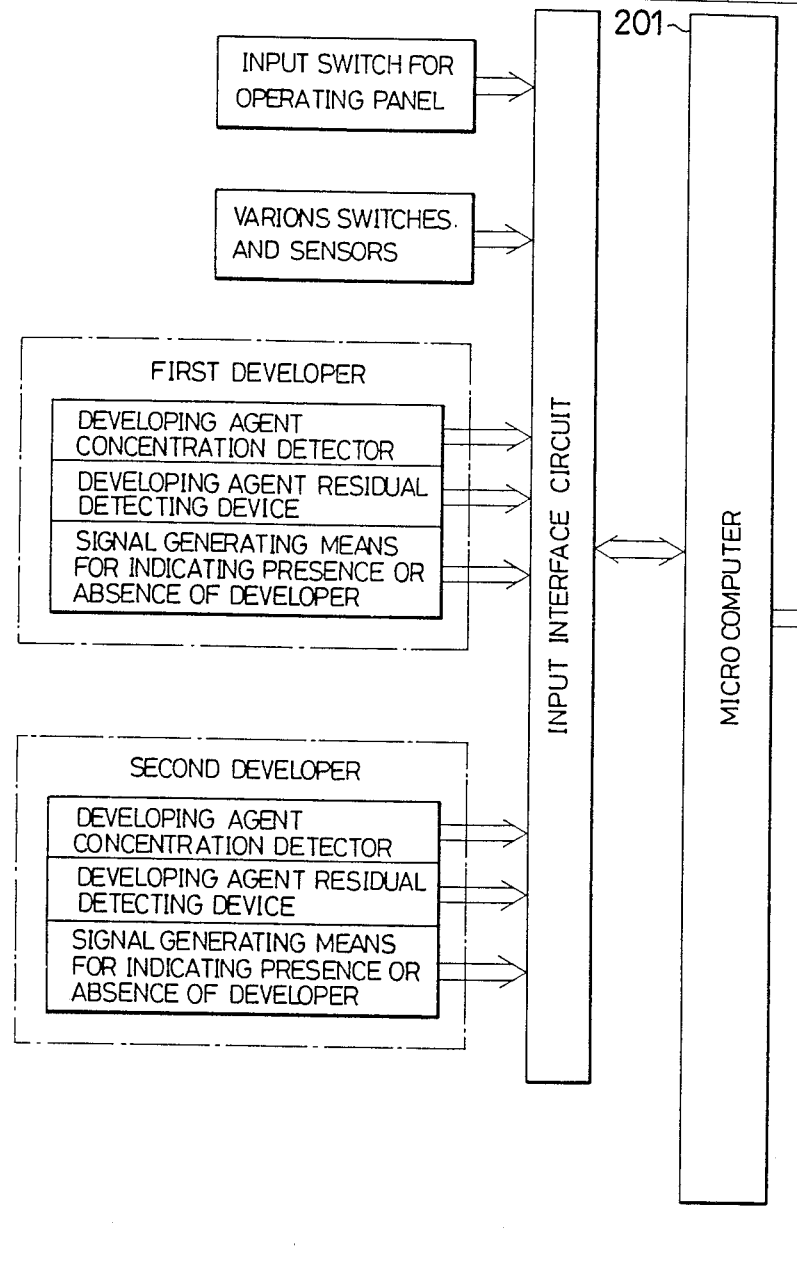
FIG. 11a, and 11b are a block diagram for the control circuit in a second embodiment.
Figure 11B:
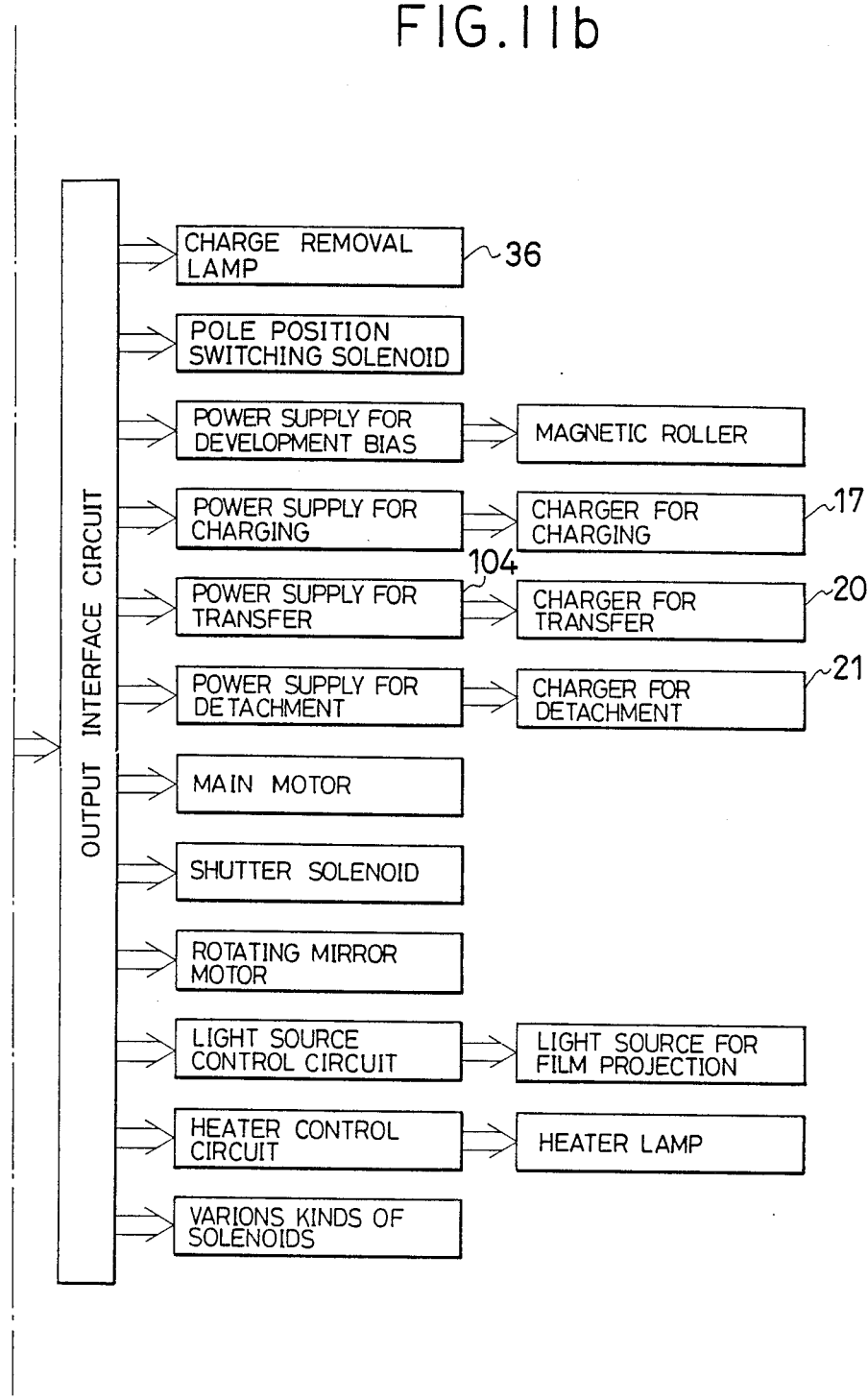

In this case, the discharge light sources 36 are controlled by the microcomputer 100 (FIG. 11) to have a relationship among the charging width, exposure width, discharge light source width, developing width, and paper width to be given, to reduce the waste of the toner, by "charging width > developing width > exposure width > paper width" for the inverted development, and by "exposure width > charging width > developing width > paper width," with the exposure width that includes the discharge light source width, for the normal development, as shown in FIG. 10.

It should be noted that the present invention is not limited to this embodiment alone, and the exposure width may be adjusted by providing a shutter device on both sides of the slit 34. Further, the charging width may also be adjusted by providing a plurality of chargers.

As described in the above, according to the second embodiment of the present invention, toner waste can be prevented for both cases of the normal development and the inverted development, by providing means for regulating the exposure and charging widths which adjust the exposure width and the charging width to their optimum values.

Figure 12:
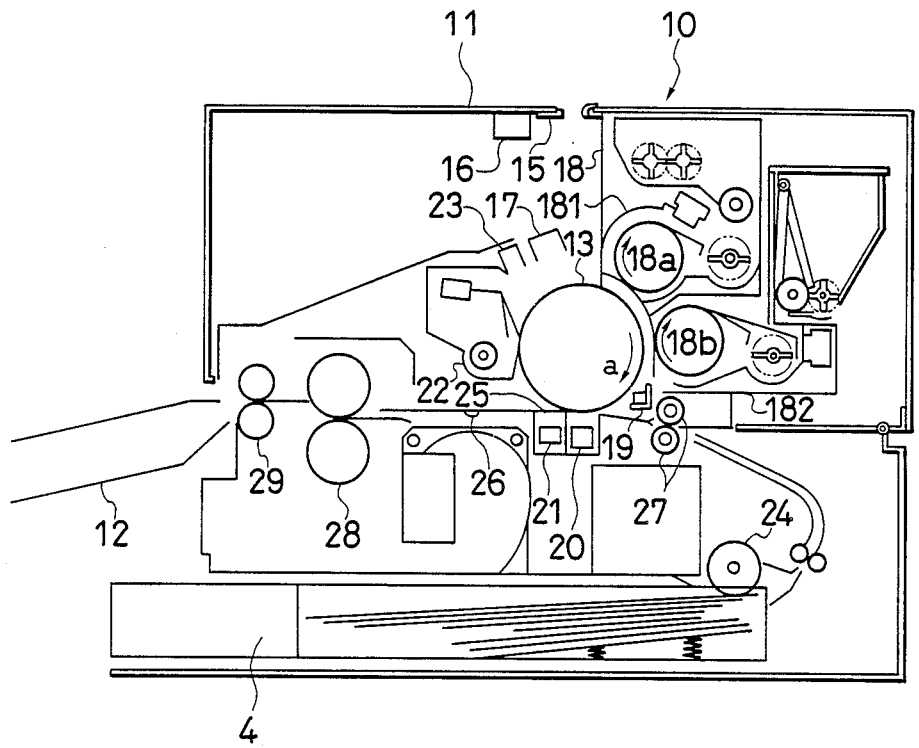
FIG. 12 is an internal block diagram for the image formation unit of a third embodiment of the microfilm reader-printer in accordance with the present invention.

Referring to FIG. 12, a third embodiment of the microfilm reader-printer in accordance with the present invention is shown.

The image formation unit 10 of the third embodiment has a unit body 11, and in the lower part of the front face side of the unit body 11 there is set a paper feeding cassette 4, and a tray 12 for ejected paper is set above the paper feeding cassette 4. Above an image bearer drum 13 which is situated at about the center of the unit body 11, there are arranged a shutter mechanism 15 for shielding the scanning light from the scanning light guiding unit 9, and a solenoid 16 for driving the shutter mechanism 15.

In the surroundings of the photosensitive drum 13 there are arranged a charger 17, developing device 18, pre-transfer discharger 19, transfer charger 20, detachment charger 21, cleaner 22, discharge lamp 23, and others. In the lower part of the unit body 11, there is formed a paper transporting route 26 which leads a paper which is taken out automatically from the paper feeding cassette 4 via a paper feeding roller 34, through an image formation unit 25 formed between the photosensitive drum 13 and the transfer charger 20, to the tray 12 for ejected paper. On the upstream side of the image formation unit 25 of the paper transporting route 26, there are provided resist rollers 27, and on its downstream side there are provided heat rollers 28 and paper eject rollers 29 as the fixing device.

When the photosensitive drum 13 is driven in the direction of the arrow a of the figure, it is first charged uniformly by the charger 17, and the operating light from the scanning light guiding unit 9 is focused successively on the photosensitive drum 13 to form an electrostatic latent image. The electrostatic latent image thus formed is developed by the developing device 18 to be brought out explicitly, and is sent to the side of the transfer charger 20. On the other hand, a paper fed by the paper feeding cassette 4 is supplied by the resist rollers 27, and an image formed on the photosensitive drum 13 beforehand is transferred to the paper by the transfer charger 20. The paper that has the transferred image on it is peeled off from the photosensitive drum 13 by the detachment charger 21, and led to the heat rollers 28 by way of the paper transporting route 26. After the transferred image the is fixed by melting there, the paper is ejected to the tray 12 for ejected paper by the paper eject rollers 29. On the other hand, after the image is transferred to the paper, the residual image on the photosensitive drum 13 is erased in order to be ready for the next copying operation.

The developing device 18 has a first developing roller 18a and a second developing roller 18b. By a selective operation of the developing rollers 18a and 18b, it is designed to be able to develop both of a negatively recorded microfilm and a positively recorded microfilm into positive images. Namely, the developing device 18 is divided into two parts of a first developing apparatus 181 that contains the first developing roller 18a and a second developing apparatus 182 that contains the second developing roller 18b, and the first developing apparatus 181 carries out positive → positive development and the second developing apparatus 182 carries out negative → positive development.

In the development mode for carrying out the positive → positive development (referred to as the P-P development mode hereinafter), the image that is formed on the paper becomes brighter when exposure to the light source lamp of the light source 5 is increased and it becomes darker when the exposure is decreased. Further, in the development mode for carrying out negative → positive development (referred to as the N-P development mode hereinafter), the image that is formed on the paper becomes brighter when exposure to the light source lamp of the light source 5 is decreased and it becomes darker when the exposure is increased.

Figure 13:
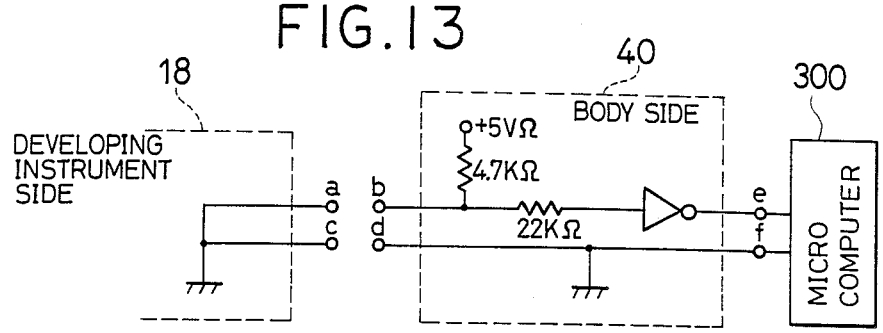
FIG. 13 is a circuit diagram for the detection unit of the developing apparatus for the third embodiment.

With the above construction, a detection circuit as shown in FIG. 13 is used for the first developing apparatus 181 and the second developing apparatus 182 in the third embodiment.

As shown in FIG. 13, the detection circuit 40 is connected to a central control circuit 300 such as a microcomputer that includes a CPU.

When the developing apparatus 18 (meaning either the first developing apparatus 181 or the second developing apparatus 182) is set on the body of the detection circuit 40, terminal a and terminal b are connected. Then, between the terminals c and d, there appears a TTL level signal which is an electrical signal of "H" level when the developing apparatus 18 is set on the body, and an electrical signal of "L" level when the developing apparatus is not set. By means of this signal, the central control circuit 300 detects the setting condition for each of the first developing apparatus 181 and the second developing apparatus 182.

Here, if the developing apparatus (either one of the first developing apparatus 181 or the second developing apparatus 182) selected by the operation on the control panel is not set, it means that the machine is unable to carry out copying. Hence, a system program is adopted in which the central control circuit ignores the copy start switch thereafter.

In the state in which all of the developing apparatuses (both of the first developing apparatus 181 and the second developing apparatus 182) are not set, all the functions related to image formation (image formation unit 10) are first brought to a standstill, and all of the LED displays on the panel in the body front that are related to image formation are put out. As for the key acceptance, regarding the display of the warning light on the front panel due to an error generated within the body 40, while the machine is being used as a reader (mainly the projection unit 6), it is designed to be carried out immediately after the occurrence of the error.

Figure 14:
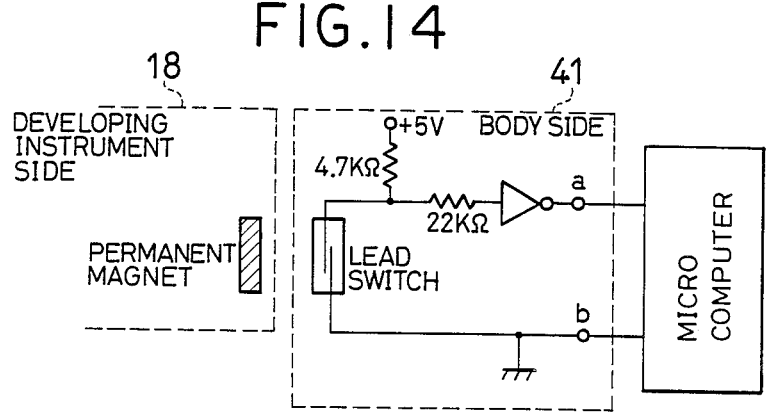
FIG. 14 and FIG. 15 are circuit diagrams for each of the modifications of the detection circuit for the developing apparatus.
Figure 15:
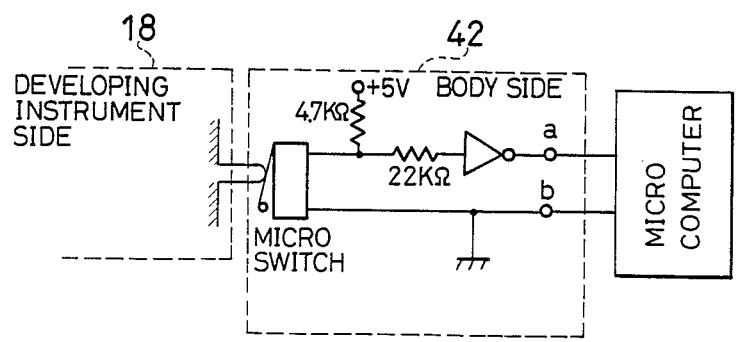

Moreover, the detection circuit may be constructed as shown in FIG. 14 or FIG. 15.

In a modification shown in FIG. 14, at the time of setting the developing apparatus 18 on the body 41, a lead switch fixed to the body 41 is brought to on-state by the magnetism of a permanent magnet that is fixed to the developing apparatus 18, so that there appears an "H" signal of TTL level between the terminals a and b. When the developing apparatus 18 are not set, an "L" signal appears between the terminals a and b.

In a modification shown in FIG. 15, at the time of setting the developing apparatus 18 on the body 42, a protrusion fixed to the developing apparatus 18 presses to turn on a microswitch that is fixed on the body 42 side, so that an "H" signal of TTL level appears between the terminals a and b. When the developing apparatus 18 are not set, an "L" signal appears between the terminals a and b.

Figure 16:
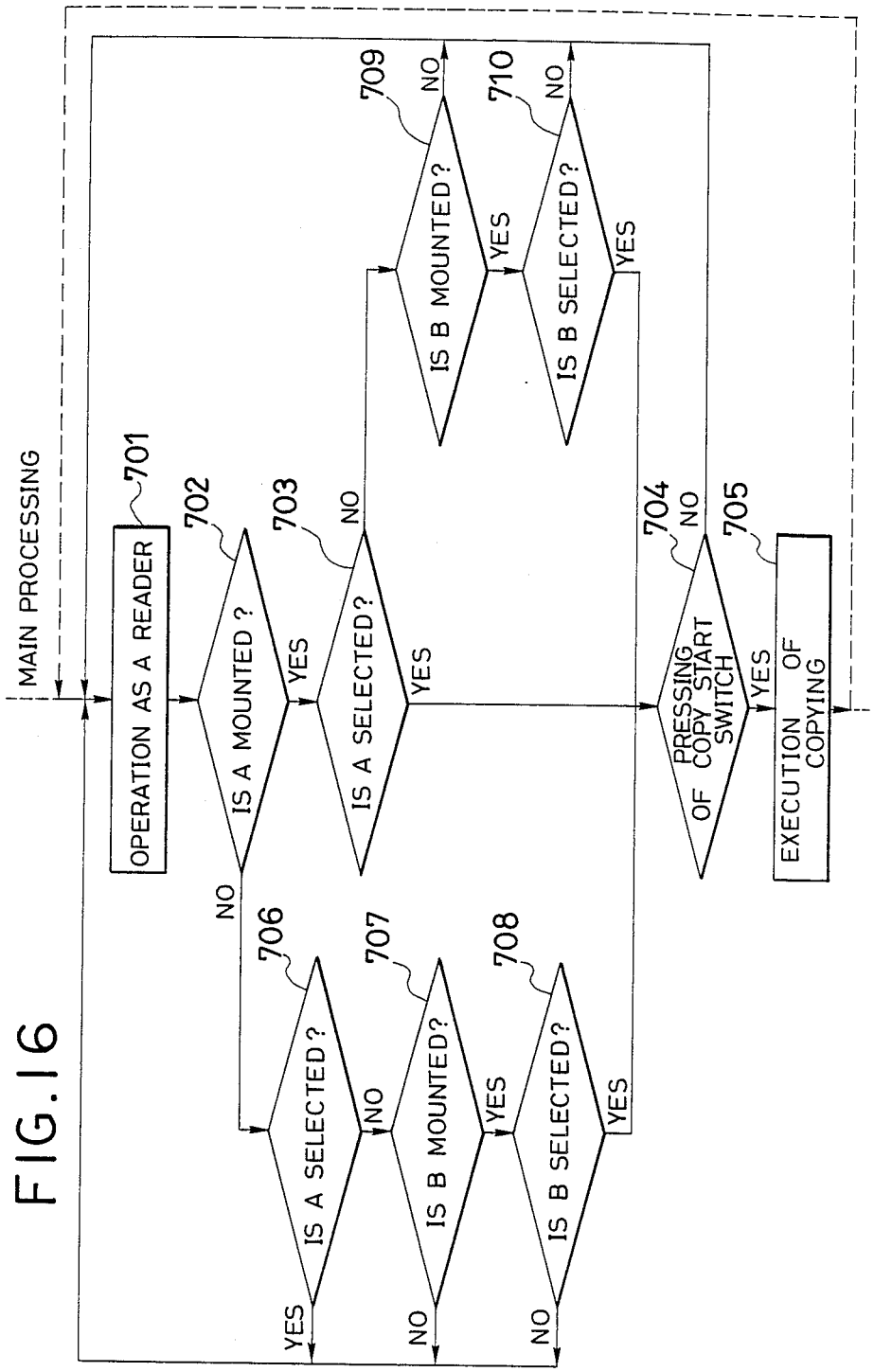
FIG. 16 is a flow chart which shows the operation of the third embodiment.

In the case of carrying out detection of setting or nonsetting of the developing apparatus 18, by means of one of the detection circuits shown in FIG. 13, FIG. 14, or FIG. 15, the operation will be described according to a flow chart shown in FIG. 16. In FIG. 16, developing apparatus A signifies the first developing apparatus 181 and developing apparatus B signifies the second developing apparatus 182.

In the first step 701 that follows the main processing, the operation as a reader is executed. If the copy start switch is depressed (affirmative case of step 704) with the developing apparatus A mounted (affirmative case of step 702) and the developing apparatus A selected (affirmative case of step 703), the copying processing will be executed (step 705). On the other hand, while the developing apparatus A is not set (negative case of step 702), if the developing apparatus A is not selected (negative case of step 706), the developing apparatus B is set (affirmative case of step 707), the developing apparatus B is selected (affirmative case of step 708), and the copy start switch is depressed (affirmative case of step 704), then the copying processing will be executed (step 705). Moreover, in the state in which the developing apparatus A is set (affirmative case of step 702), when the developing apparatus A is not selected, if the developing apparatus B is set (affirmative case of step 708) and the developing apparatus B is selected (affirmative case of step 710), then the copying processing will be executed (step 705) by the depressing of the copy start switch (affirmative case of step 704).

However, while the developing apparatus A is not set (negative case of step 702), if the developing apparatus A is selected (affirmative case of step 706), or if the developing apparatus A is not selected, and the developing apparatus B is not set (negative case of step 707), or if the developing apparatus A is not selected, the developing apparatus B is not set, and the developing apparatus B is not selected (negative case of step 708), then the operation returns to step 701.

Furthermore, even when the developing apparatus A is set (affirmative case of step 702), if the developing apparatus A is not selected (negative case of step 703) and the developing apparatus B is not set (negative case of step 709), or if the developing apparatus A is not selected, the developing apparatus B is not set and the developing apparatus B is not selected (negative case of step 710), then the operation goes back to step 701. Moreover, if the copy start switch is not depressed (negative case of step 704), the operation goes back to step 701.

From the above considerations, it will be seen that the system may be used as a microfilm reader even under the condition which prohibits the image formation (copying) operation. Moreover, there may be formed a loop which is shown by the chained line in FIG. 16.

It should be mentioned that in a reader-printer of the above kind, a construction may be adopted by which the selection of a developing apparatus is forbidden when the developing apparatus is not set.

In that case, there may be adopted an arrangement by which the kind of developing apparatus that is set can be displayed.

Figure 17:
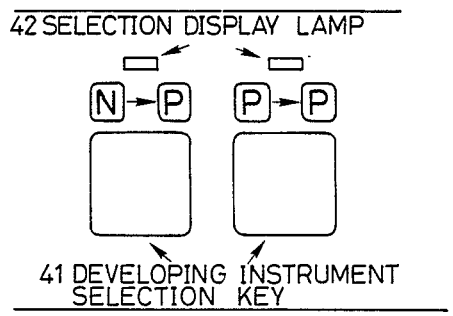
FIG. 17 and FIG. 18 are explanatory diagrams which shown the case in which copying is forbidden by the nonsetting of the developing apparatus in the third embodiment.
Figure 18:
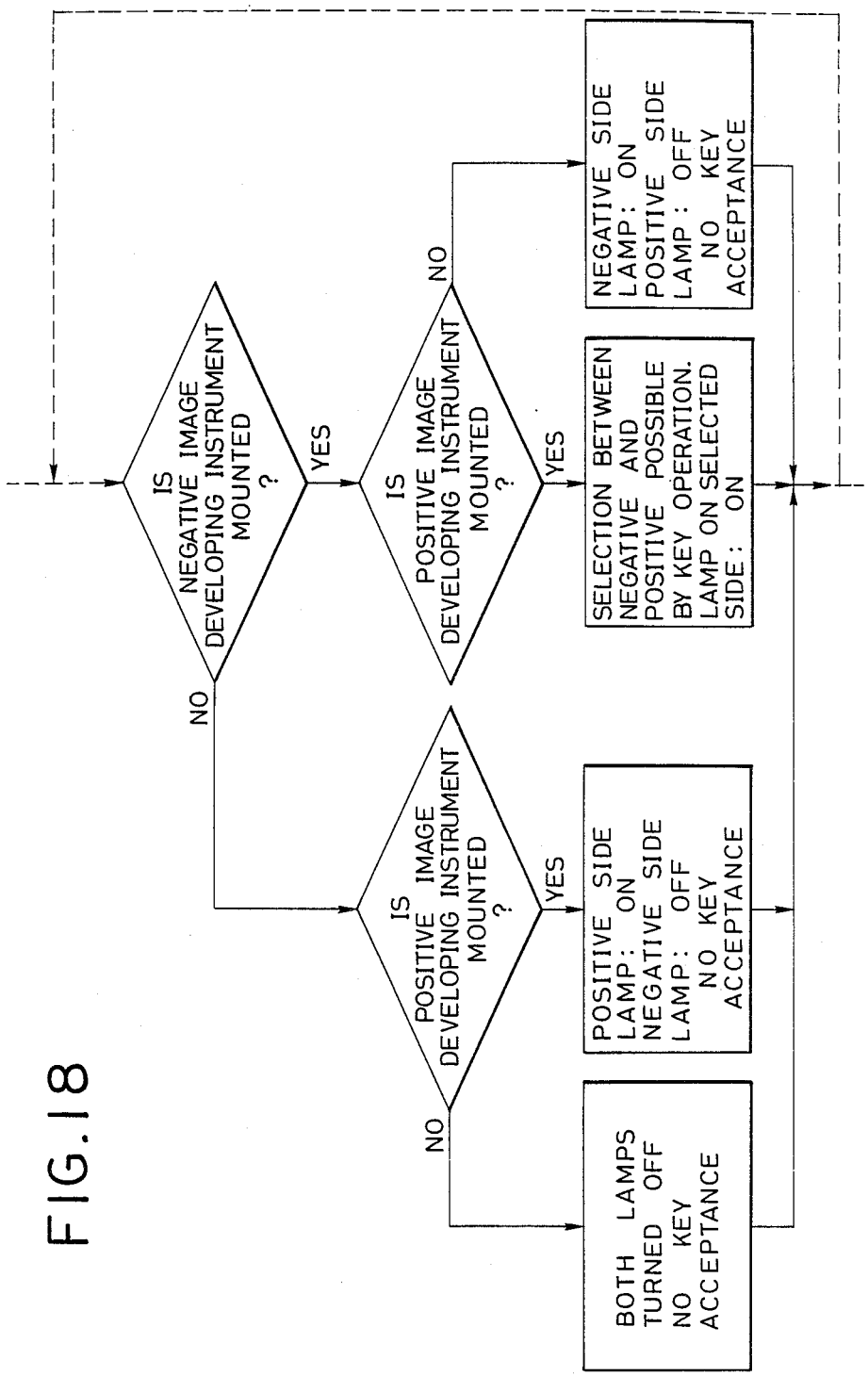

Referring to FIG. 17 and FIG. 18, realization of such a construction will be described next.

In such embodiments, the central control circuit in the body detects the presence or absence of the two developing apparatuses to forbid the copying by the developing apparatus that is not set.

Furthermore, the acceptance of the key input for the selection of the developing apparatus is set to be impossible, and the display lamp for showing the selection condition is fixed to the lighting only of the developing apparatus that is being set.

In FIG. 17 is illustrated the disposition of the developing apparatus selection key 41 and the selection display lamps 42 on the front panel.

In FIG. 18 is shown a flow chart that illustrates that processing situations following the detection.

In FIG. 13, if the developing apparatus is set on the body 40, the terminals a and b are connected electrically, and so are connected the terminals c and d. Then, between the terminal e and f, there appears a TTL level signal which is an "H" signal when the developing apparatus is et, and an "L" signal when it is not set.

As explained in the above, according to the third embodiment, the system can be used as a microfilm reader even when it is under the condition in which the image formation operation is forbidden. Therefore, it will be extremely convenient for the user of the system.

Various modifications will become possible for these skilled in the art after receiving the teachings of the present disclosure without departing from the scope thereof.

What is claimed is:

1. An image formation device for forming an electrostatic latent image on an image bearing member in accordance with a scanning light of an image information and for transferring the electrostatic latent image formed on the image bearing member to a recording medium, comprising:

means for detecting a size of the recording medium;

means, having on and off states, for charging the image bearing member;

means for exposing the image bearing member to the scanning light of the image information;

shutter means, having open and closed states, for shutting off the scanning light from said exposing means to the image bearing member; and means for controlling said shutter means and said charging means in response to the size of the recording medium detected by said detecting means, so that in the case of inverted development said charging means remains on while the opening and the closing of said shutter means is controlled, and in the case of normal development said shutter means remains open while the on and off states of said charging means is controlled.

2. The image formation device as in claim 1, further comprising a light source which operates continually during the image forming and image transferring stages.

3. The image formation device as in claim 1, wherein said controlling means controls said charging means in a non-inverted development, the non-inverted development including a P-P development for forming a positive image from a positive image.

4. The image formation device as in claim 3, wherein the image bearing member comprises an image bearing roll which can be rotated and said controlling means controls said charging means so that a charging length on the image bearing roll in a rotated direction corresponds to the size of the recording medium detected by said detecting means.

5. The image formation device as in claim 1, wherein said controlling means controls said shutter means in an inverted development, the inverted development including a N-P development for forming a positive image from a negative image.

6. The image formation device as in claim 5, wherein the image bearing member comprises an image bearing roll which can be rotated and said controlling means controls said shutter means so that a light exposure length on the image bearing roll in a rotated direction corresponds to the size of the recording medium detected by said detecting means.

7. The image formation device as in claim 1, wherein said shutter means comprises a shutter for shielding the scanning light, a linking mechanism for opening and closing the shutter, and a shutter solenoid for driving the linking mechanism.

8. An image formation device for forming an electrostatic latent image on an image bearing member in accordance with a scanning light of an image information and for transferring the electrostatic latent image formed on the image bearing member to a recording medium, comprising:

means for detecting a width of the recording medium;

means, having on and off states, for charging the image bearing member with a width;

means for exposing the image bearing member to the scanning light with a predetermined width of the image information;

means for adjusting the width of the scanning light from said exposing means; and means for controlling said adjusting means so that in the case of inverted development the width of the scanning light is smaller than the width charged by said charging means, and in the case of normal development the width of the scanning light is larger than the width charged by said charging means.

9. The image formation device as claimed in claim 8, wherein the width of the scanning light is larger than the width of the recording medium detected by said detecting means in the case of inverted development, and the width charged by said charging means is larger than the width of the recording medium in the case of normal development.

* * * * *